United States Patent
Riach et al.

(10) Patent No.: US 7,426,594 B1
(45) Date of Patent: Sep. 16, 2008

(54) APPARATUS, SYSTEM, AND METHOD FOR ARBITRATING BETWEEN MEMORY REQUESTS

(75) Inventors: Duncan A. Riach, Eastbourne (GB); Brijesh Tripathi, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 213 days.

(21) Appl. No.: 10/961,574

(22) Filed: Oct. 8, 2004

(51) Int. Cl.
*G06F 12/00* (2006.01)
*G06F 13/14* (2006.01)
*G06F 12/02* (2006.01)

(52) U.S. Cl. .................. 710/244; 345/558; 345/520; 345/505; 711/150; 711/151

(58) Field of Classification Search ......... 710/240–244; 345/531–535, 558, 501–521
See application file for complete search history.

(56) References Cited

U.S. PATENT DOCUMENTS

| | | | | |
|---|---|---|---|---|
| 4,439,760 | A * | 3/1984 | Fleming | 345/520 |
| 4,663,619 | A * | 5/1987 | Staggs et al. | 345/567 |
| 5,233,336 | A * | 8/1993 | Byron et al. | 345/25 |
| 5,325,485 | A | 6/1994 | Hochmuth et al. | |
| 5,530,797 | A * | 6/1996 | Uya et al. | 345/532 |
| 5,805,905 | A | 9/1998 | Biswas et al. | |
| 5,809,278 | A * | 9/1998 | Watanabe et al. | 711/150 |
| 5,953,019 | A * | 9/1999 | Shimakawa et al. | 345/535 |
| 6,006,303 | A | 12/1999 | Barnaby et al. | |
| 6,173,378 | B1 | 1/2001 | Rozario et al. | |
| 6,189,064 | B1 | 2/2001 | MacInnis et al. | |
| 6,205,524 | B1 * | 3/2001 | Ng | 711/151 |
| 6,563,506 | B1 | 5/2003 | Wang | |
| 6,573,905 | B1 | 6/2003 | MacInnis et al. | |
| 6,587,118 | B1 * | 7/2003 | Yoneda | 345/629 |
| 6,684,301 | B1 | 1/2004 | Martin | |
| 6,870,538 | B2 * | 3/2005 | MacInnis et al. | 345/505 |
| 7,050,071 | B2 * | 5/2006 | Wyatt et al. | 345/649 |
| 7,209,992 | B2 * | 4/2007 | MacInnis et al. | 710/244 |
| 2004/0174370 | A1 * | 9/2004 | Stoll et al. | 345/502 |

OTHER PUBLICATIONS

U.S. Appl. No. 10/903,403, filed Jul. 29, 2004, Tripathi et al.

* cited by examiner

*Primary Examiner*—Paul R. Myers
*Assistant Examiner*—Brian Misiura
(74) *Attorney, Agent, or Firm*—Cooley Godward Kronish LLP

(57) ABSTRACT

Apparatus, system, and method for arbitrating between memory requests are described. In one embodiment, a processing apparatus includes a memory request generator configured to generate memory requests specifying data for respective presentation elements. The memory request generator is configured to assign priorities to the memory requests based on a presentation order of the presentation elements. The processing apparatus also includes a memory request arbiter connected to the memory request generator. The memory request arbiter is configured to issue the memory requests based on the priorities assigned to the memory requests.

4 Claims, 3 Drawing Sheets

US 7,426,594 B1

APPARATUS, SYSTEM, AND METHOD FOR ARBITRATING BETWEEN MEMORY REQUESTS

BRIEF DESCRIPTION OF THE INVENTION

The invention relates generally to servicing memory requests. More particularly, the invention relates to an apparatus, system, and method for arbitrating between memory requests.

BACKGROUND OF THE INVENTION

In current graphics processing systems, the number and processing speed of memory clients have increased enough to make memory access latency a barrier to achieving high performance. In some instances, various memory clients share a common memory, and each memory client issues requests for data stored in the common memory based on individual memory access requirements. Requests from these memory clients are typically serialized through a common interface. As a result, requests are sometimes queued up for servicing prior to a critical request. In some instances, a non-critical request subsequently becomes critical but is queued up for servicing behind non-critical requests. A critical request typically refers to a request that should be serviced promptly to prevent underflow of an output data stream or overflow of an input data stream, which underflow or overflow can sometimes lead to screen corruption. However, a critical request issued behind non-critical requests may have to wait for all those non-critical requests to be serviced first, thus leading to increased service time for the critical request and potential screen corruption.

It is against this background that a need arose to develop the apparatus, system, and method described herein.

SUMMARY OF THE INVENTION

In one aspect, the invention relates to a processing apparatus. In one embodiment, the processing apparatus includes a memory request generator configured to generate memory requests specifying data for respective presentation elements. The memory request generator is configured to assign priorities to the memory requests based on a presentation order of the presentation elements. The processing apparatus also includes a memory request arbiter connected to the memory request generator. The memory request arbiter is configured to issue the memory requests based on the priorities assigned to the memory requests.

In another embodiment, the processing apparatus includes a memory request arbiter configured to receive a first memory request specifying data for a first presentation element and a second memory request specifying data for a second presentation element. The memory request arbiter is configured to arbitrate between the first memory request and the second memory request based on a presentation order of the first presentation element and the second presentation element.

In another aspect, the invention relates to a method of arbitrating between memory requests specifying data for respective visual elements. In one embodiment, the method includes identifying a display order of the visual elements. The method also includes arbitrating between the memory requests based on the display order of the visual elements.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
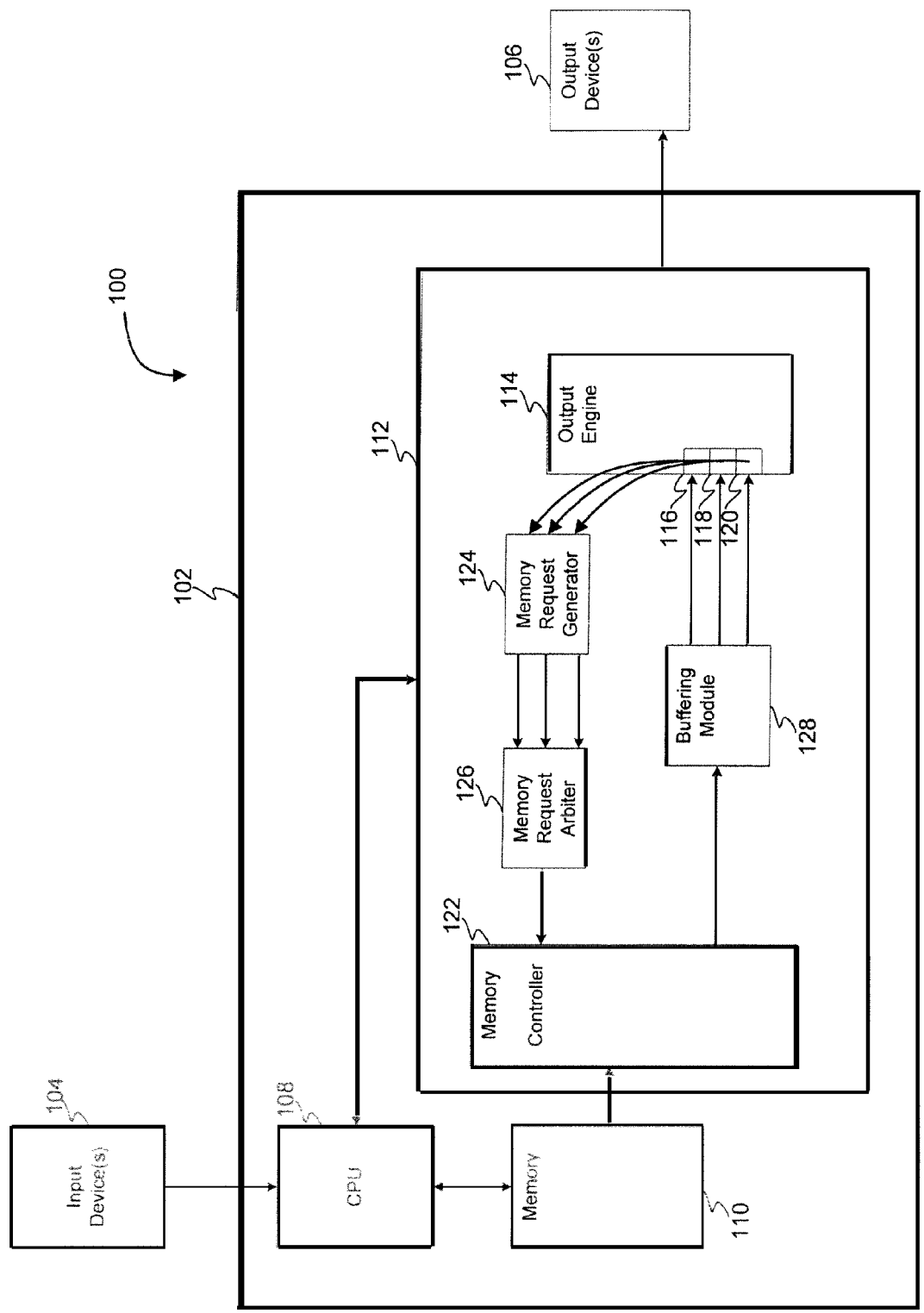
FIG. 1 illustrates a computer system that can be operated in accordance with an embodiment of the invention.

FIG. 1 illustrates a computer system 100 that can be operated in accordance with an embodiment of the invention. The computer system 100 includes a computer 102, which can correspond to, for example, a personal computer, a workstation, a set-top box, a portable computing device, a game console, or any other device with digital signal processing capability. As illustrated in FIG. 1, the computer 102 is connected to a set of input devices 104, which can include, for example, a keyboard and a mouse. The computer 102 is also connected to a set of output devices 106, which can include, for example, a speaker, a television set, a Cathode Ray Tube monitor, and a Liquid Crystal Display monitor.

The computer 102 includes a Central Processing Unit ("CPU") 108, which is connected to a memory 110. The memory 110 can include, for example, a Random Access Memory ("RAM") and a Read Only Memory ("ROM"). As illustrated in FIG. 1, the computer 102 also includes a processing apparatus 112 that is connected to the CPU 108 and the memory 110. The processing apparatus 112 can correspond to a graphics processing apparatus, such as, for example, a Graphics Processing Unit ("GPU"). The processing apparatus 112 performs a number of processing operations to generate visual outputs using the set of output devices 106. Alternatively, or in conjunction, the processing apparatus 112 performs a number of processing operations to generate audio outputs or any other streaming outputs using the set of output devices 106.

In the illustrated embodiment, the processing apparatus 112 includes an output engine 114, which includes memory clients 116, 118, and 120. While three memory clients are illustrated in FIG. 1, it is contemplated that more or less memory clients can be included depending on the particular implementation. In the illustrated embodiment, the memory clients 116, 118, and 120 process data to generate respective presentation elements using the set of output devices 106. For example, the memory client 116 can process data to generate a first presentation element, the memory client 118 can process data to generate a second presentation element, and the memory client 120 can process data to generate a third presentation element. A presentation element can correspond to a visual element included in a visual output or an audio element included in an audio output. At least one of the memory clients 116, 118, and 120 can correspond to a graphics processing module that processes data to generate a visual element. For example, the memory clients 116, 118, and 120 can correspond to graphics processing modules that process data to generate respective visual elements that can be layered or otherwise combined to form a visual output. Alternatively, or in conjunction, at least one of the memory clients 116, 118, and 120 can correspond to an audio processing module that processes data to generate an audio element. The memory clients 116, 118, and 120 can generate respective presentation elements using the same output device or using different output devices included in the set of output devices 106. Typically, at least one of the memory clients 116, 118, and 120 corresponds to an isochronous memory client, which is one that expects data to be delivered in a substantially periodic manner or in accordance with a baseline rate. As can be appreciated, untimely delivery of data to such an isochronous memory client can lead to a stall and degradation of a visual or an audio output.

In the illustrated embodiment, the processing apparatus 112 also includes a memory controller 122, which is connected to the output engine 114 via a memory request generator 124 and a memory request arbiter 126. The memory controller 122 serves as an interface between the memory clients 116, 118, and 120 and the memory 110. In the illustrated embodiment, the memory request arbiter 126 issues memory requests for the memory clients 116, 118, and 120, and, in response to these memory requests, the memory controller 122 retrieves data from the memory 110 for the memory clients 116, 118, and 120. The operation of the memory request generator 124 and the memory request arbiter 126 is further discussed below.

As illustrated in FIG. 1, the processing apparatus 112 also includes a buffering module 128, which is connected between the memory controller 122 and the output engine 114. The buffering module 128 temporarily stores data retrieved by the memory controller 122 and delivers the data to the memory clients 116, 118, and 120. The buffering module 128 can serve to cover for or reduce memory access latency by storing an advance supply of data to be processed by the memory clients 116, 118, and 120. The buffering module 128 can be implemented using an array of First-in First-Out ("FIFO") buffers, such that each FIFO buffer has a buffering space that is dedicated for a particular one of the memory clients 116, 118, and 120. The buffering module 128 also can be implemented using a unitary FIFO buffer, which has a buffering space that is shared by the memory clients 116, 118, and 120. Such a unitary FIFO buffer can be implemented as discussed, for example, in the co-pending and co-owned patent application of Tripathi et al., entitled "Apparatus, System, and Method for Delivering Data to Multiple Memory Clients via a Unitary Buffer," U.S. patent application Ser. No. 10/903,403, filed on Jul. 29, 2004, the disclosure of which is incorporated herein by reference in its entirety.

As illustrated in FIG. 1, the processing apparatus 112 also includes the memory request generator 124 and the memory request arbiter 126, which are connected between the memory controller 122 and the output engine 114. As discussed previously, the memory clients 116, 118, and 120 process data to generate respective presentation elements. In the illustrated embodiment, the memory clients 116, 118, and 120 issue service requests to access data stored in the memory 110, and, in response to these service requests, the memory request generator 124 generates memory requests for the memory clients 116, 118, and 120. Typically, data specified by the service requests is at a coarser level of granularity than data specified by the memory requests. Accordingly, the memory request generator 124 typically generates multiple memory requests in response to receiving a particular one of the service requests. Data specified by the memory requests can be at a level of granularity that is efficient in terms of accessing the memory 110. In illustrated embodiment, each of the service requests specifies data for a particular one of the memory clients 116, 118, and 120 at a frame level of granularity, while each of the memory requests specifies data for a particular one of the memory clients 116, 118, and 120 at a sub-frame level of granularity (e.g., at a pixel level of granularity or at a group of pixels level of granularity). In particular, each of the memory requests specifies data to be processed by a particular one of the memory clients 116, 118, and 120 to generate a respective presentation element. For example, the memory request generator 124 can generate a first memory request specifying data to be processed by the memory client 116 to generate a first presentation element. Also, the memory request generator 124 can generate a second memory request specifying data to be processed by the memory client 118 to generate a second presentation element. In addition, the memory request generator 124 can generate a third memory request specifying data to be processed by the memory client 120 to generate a third presentation element.

In the illustrated embodiment, the memory request generator 124 identifies a presentation order of the presentation elements and provides an indication of this presentation order to the memory request arbiter 126. In some implementations, the presentation elements include visual elements, and the memory request generator 124 identifies a presentation order of these visual elements based on, for example, screen locations of these visual elements. In other implementations, the presentation elements include audio elements, and the memory request generator 124 identifies a presentation order of these audio elements based on, for example, time stamps of these audio elements.

As illustrated in FIG. 1, the memory request generator 124 is connected to the memory request arbiter 126, which receives the memory requests generated by the memory request generator 124. The memory request arbiter 126 arbitrates between the memory requests to determine the order in which the memory requests should be issued to the memory controller 122. In the illustrated embodiment, the memory request arbiter 126 arbitrates between the memory requests based on the presentation order of the presentation elements. In particular, the memory request arbiter 126 issues the memory requests to the memory controller 122 based on the indication of this presentation order that is provided by the memory request generator 124. With reference to the previous example, the memory request arbiter 126 can issue the first memory request prior to the second memory request based on whether the first presentation element is to be presented prior to the second presentation element. Similarly, the memory request arbiter 126 can issue the second memory request prior to the third memory request based on whether the second presentation element is to be presented prior to the third presentation element.

Advantageously, the illustrated embodiment allows memory requests to be properly prioritized for servicing based on a presentation order of presentation elements. As discussed previously, at least one of the memory clients 116, 118, and 120 can correspond to an isochronous memory client. By servicing the memory requests based on the presentation order of the presentation elements, the illustrated embodiment allows timely delivery of data to respective ones of the memory clients 116, 118, and 120 as the presentation elements are generated, thus avoiding a stall and degradation of a visual or an audio output. Accordingly, the illustrated embodiment serves to reduce instances in which a memory request becomes critical, since such a memory request will typically be prioritized for servicing ahead of other memory requests. In the event a memory request does become critical, the illustrated embodiment serves to reduce the service time for such a critical memory request, since such a critical memory request will typically be prioritized for servicing ahead of other memory requests.

Figure 2:
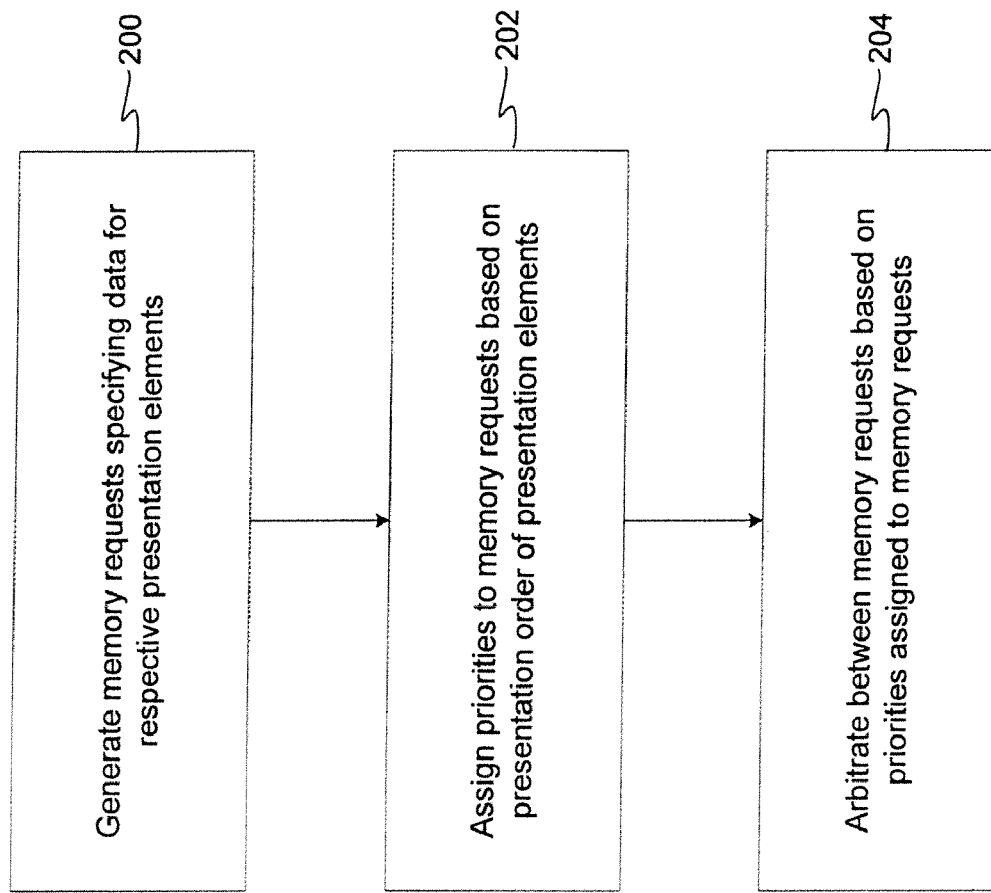
FIG. 2 illustrates a flow chart for servicing memory requests in accordance with an embodiment of the invention.

Attention next turns to FIG. 2, which illustrates a flow chart for servicing memory requests in accordance with an embodiment of the invention.

The first operation illustrated in FIG. 2 is to generate memory requests specifying data for respective presentation elements (block 200). In the illustrated embodiment, the presentation elements correspond to visual elements that can be layered or otherwise combined to form a visual output. Examples of visual elements include display surfaces representing a base, a cursor, and an overlay. A memory request generator (e.g., the memory request generator 124) generates the memory requests in response to receiving service requests from various memory clients (e.g., the memory clients 116, 118, and 120). As discussed previously, data specified by the service requests is typically at a coarser level of granularity than data specified by the memory requests. Accordingly, the memory request generator can generate multiple memory requests in response to receiving a particular one of the service requests.

Figure 3:
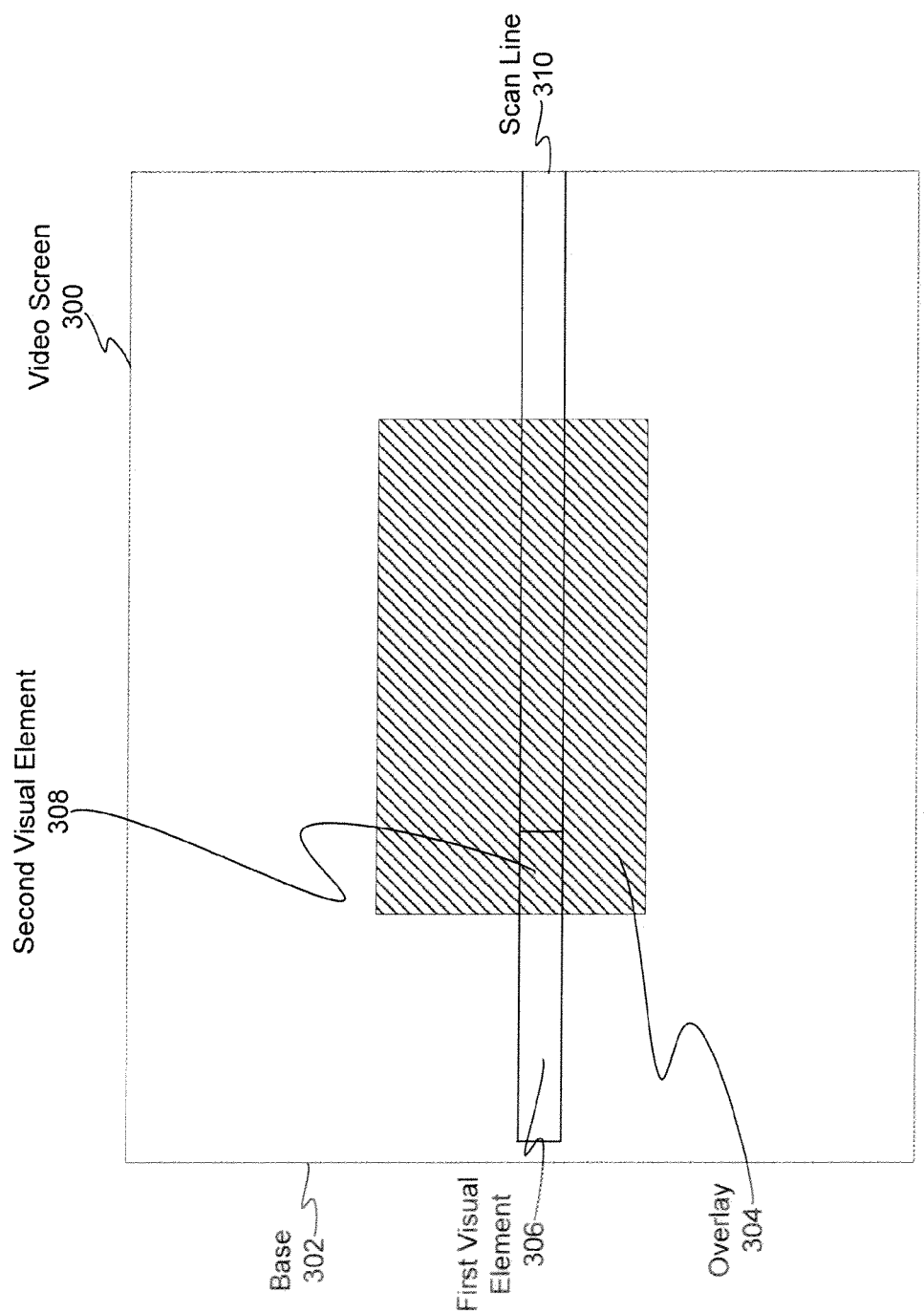
FIG. 3 illustrates an example of a video screen on which visual elements are displayed in accordance with a scan-out order.

FIG. 3 illustrates an example of a video screen 300 on which a visual output is displayed. In the illustrated example, the visual output includes a base 302 and an overlay 304 that is layered on top of the base 302. The base 302 can correspond to, for example, a background image, while the overlay 304 can correspond to, for example, a window containing a foreground image. When generating the visual output, a first memory client processes data to generate visual elements representing the base 302 (e.g., a first visual element 306), while a second memory client processes data to generate visual elements representing the overlay 304 (e.g., a second visual element 308). In response to receiving a service request from the first memory client, the memory request generator generates a first memory request specifying data for the first visual element 306. Also, in response to receiving a service request from the second memory client, the memory request generator generates a second memory request specifying data for the second visual element 308. In general, data specified by the first memory request and data specified by the second memory request can be at the same level of granularity or at different levels of granularity.

The second operation illustrated in FIG. 2 is to assign priorities to the memory requests based on a presentation order of the presentation elements (block 202). In the illustrated embodiment, the memory request generator identifies a display order of the visual elements and assigns priorities to the memory requests based on this display order. In particular, the memory request generator assigns a higher priority to a memory request that specifies data for a visual element to be displayed earlier in time. On the other hand, the memory request generator assigns a lower priority to a memory request that specifies data for a visual element to be displayed later in time. In the illustrated embodiment, the memory request generator provides an indication of the assigned priorities in the form of one or more tags that are incorporated in the memory requests. Alternatively, the memory request generator can provide the indication of the assigned priorities separately from the memory requests.

Referring to FIG. 3, visual elements representing the base 302 and the overlay 304 are displayed along a scan line 310 that is directed, for example, from left to right and from top to bottom. In the illustrated example, the memory request generator identifies a display order of the first visual element 306 and the second visual element 308 based on screen locations of the first visual element 306 and the second visual element 308 with respect to the scan line 310. In particular, the display order of the first visual element 306 and the second visual element 308 corresponds to a scan-out order of the first visual element 306 and the second visual element 308. In the illustrated example, the memory request generator assigns a higher priority to the first memory request with respect to the second memory request, since the first visual element 306 is to be displayed prior to the second visual element 308 along the scan line 310. In the event two or more memory requests specify data for visual elements that have the same or overlapping screen locations (e.g., layered on top of one another), the memory request generator can assign equal priorities to these memory requests. Alternatively, the memory request generator can assign priorities to these memory requests based on a particular rule. One example of such rule is to assign a higher priority to a visual element located at a higher layer or to assign a higher priority to a visual element located at a lower layer. Another example of such rule is to assign priorities to these memory requests based on buffering space available for various memory clients in a buffering module. For example, a higher priority can be assigned to a memory request for a particular memory client if a buffering space for that memory client is becoming vacant. A further example of such rule is to assign priorities to these memory requests to provide efficiencies in terms of accessing a memory. For example, to allow for a larger memory access burst size for a particular memory client, a higher priority can be assigned to a memory request for that memory client, even if the memory request specifies data for a visual element to be displayed later in time. It is also contemplated that priorities can be assigned to these memory requests based on a combination of the rules discussed above.

The third operation illustrated in FIG. 2 is to arbitrate between the memory requests based on the priorities assigned to the memory requests (block 204). In the illustrated embodiment, a memory request arbiter (e.g., the memory request arbiter 126) issues the memory requests to a memory controller (e.g., the memory controller 122) based on the indication of the assigned priorities provided by the memory request generator. In particular, the memory request arbiter issues a memory request earlier in time if that memory request is assigned a higher priority. On the other hand, the memory request arbiter issues a memory request later in time if that memory request is assigned a lower priority.

Referring to FIG. 3, the memory request arbiter issues the first memory request prior to the second memory request based on the higher priority assigned to the first memory request. Accordingly, data for the first visual element 306 is timely delivered to the first memory client for processing, thus avoiding a stall and degradation of the visual output. In the event two or more memory requests are assigned equal priorities, the memory request arbiter can issue these memory requests based on their arrival order.

It should be recognized that the embodiments of the invention discussed above are provided by way of example, and various other embodiments are encompassed by the invention. For example, with reference to FIG. 1, it is contemplated that the processing apparatus 112 can include an additional memory request arbiter that is connected between the memory controller 122 and the memory request arbiter 126. This additional memory request arbiter can arbitrate between a memory request issued by the memory request arbiter 126 and one or more memory requests issued by additional memory clients. These additional memory clients can include one or more non-isochronous memory clients, such as, for example, the CPU 108. As another example, while the memory 110 is illustrated separately from the CPU 108 and the processing apparatus 112, it is contemplated that the memory 110 can be incorporated within the CPU 108 or the processing apparatus 112.

With reference to FIG. 1, it is contemplated that a memory request can specify data to be upscaled or downscaled in accordance with a scaling factor, such as during subsequent processing by a particular one of the memory clients 116, 118, and 120. Such upscaling or downscaling causes a data streaming rate for that memory client to depend on the scaling factor. As a result, a higher or lower priority can be assigned to the memory request for that memory client based on the scaling factor. For example, a higher priority can be assigned if the memory request specifies data to be downscaled, while a lower priority can be assigned if the memory request specifies data to be upscaled. It is contemplated that the scaling factor can be accounted for when arbitrating between the memory request and one or more memory requests issued by additional memory clients, such as, for example, one or more non-isochronous memory clients.

With reference to FIG. 1, various components of the computer system 100 can be implemented using computer code, hardwired circuitry, or a combination thereof. In particular, the memory request generator 124 can be implemented using hardwired circuitry, such as, for example, using Application-Specific Integrated Circuits ("ASICs") or Programmable Logic Devices ("PLDs"), or using computer code in place of, or in combination with, hardwired circuitry. Examples of computer code include machine code, such as produced by a compiler, and files containing higher-level code that are executed using an interpreter. Additional examples of computer code include encrypted code and compressed code. The memory request arbiter 126 can be implemented using hardwired circuitry in a number of ways. For example, the memory request arbiter 126 can be implemented using a multiplexer that selectively issues a particular memory request based on a priority assigned to that memory request. As another example, the memory request arbiter 126 can be implemented using a queue connected to a logic circuit that coordinates storage of memory requests in the queue and issuing of the memory requests from the queue. It is contemplated that the logic circuit can coordinate ordering of the memory requests in the queue based on priorities assigned to the memory requests. It is also contemplated that the logic circuit can coordinate ordering of the memory requests in the queue based on buffering space available for each of the memory clients 116, 118, and 120 in the buffering module 128. Ordering of the memory requests in the queue can be performed as, for example, discussed in the patent of Martin, entitled "Out of Order Execution Memory Access Request FIFO," U.S. Pat. No. 6,684,301, issued on Jan. 27, 2004, the disclosure of which is incorporated herein by reference in its entirety. The memory request arbiter 126 can also be implemented using computer code in place of, or in combination with, hardwired circuitry.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A processing apparatus, comprising:
a memory request arbiter configured to receive a first memory request specifying data for a first presentation element and a second memory request specifying data for a second presentation element, said memory request arbiter being configured to arbitrate between said first memory request and said second memory request based on a time order in which said first presentation element and said second presentation element are to be presented,
wherein
if said first presentation element is to be presented prior to said second presentation element, said memory request arbiter is configured to:
issue said first memory request prior to said second memory request, and
issue said second memory request subsequent to issuing said first memory request, and
else if said first presentation element is to be presented subsequent to said second presentation element, said memory request arbiter is configured to:
issue said second memory request prior to said first memory request, and
issue said first memory request subsequent to issuing said second memory request,
wherein said first presentation element and said second presentation element correspond to a first visual element and a second visual element, respectively, and said memory request arbiter is configured to arbitrate between said first memory request and said second memory request based on said time order in which said first visual element and said second visual element are to be displayed; and
a memory request generator connected to said memory request arbiter, said memory request generator being configured to generate said first memory request for a first memory client and said second memory request for a second memory client, said first memory client being configured to process said data specified by said first memory request to generate said first visual element, said second memory client being configured to process said data specified by said second memory request to generate said second visual element,
wherein said memory request generator is configured to identify said time order based on respective screen locations of said first visual element and said second visual element along a scan line.

2. The processing apparatus of claim 1, wherein said memory request generator is configured to assign priorities to said first memory request and said second memory request based on said time order, and said memory request arbiter is configured to arbitrate between said first memory request and said second memory request based on said priorities assigned to said first memory request and said second memory request.

3. The processing apparatus of claim 2, wherein said memory request generator is configured to assign a higher priority to said first memory request with respect to said second memory request based on whether said first visual element is to be displayed prior to said second visual element, and said memory request arbiter is configured to issue said first memory request prior to said second memory request based on said higher priority assigned to said first memory request.

4. The processing apparatus of claim 1, wherein said memory request generator is configured to assign equal priorities to said first memory request and said second memory request based on said time order, and said memory request arbiter is configured to arbitrate between said first memory request and said second memory request based on an order in which said first memory request and said second memory request arrive at said memory request arbiter.

* * * * *